United States Patent [19]

Naito

[11] 4,094,848

[45] June 13, 1978

[54] PROCESS FOR PRODUCING FINELY DIVIDED POROUS POLYMER PARTICLES

[75] Inventor: Kenji Naito, Odawara, Japan

[73] Assignee: Fuji Photo Film Co., Ltd., Minami-ashigara, Japan

[21] Appl. No.: 688,191

[22] Filed: May 20, 1976

[30] Foreign Application Priority Data

May 20, 1975 Japan ................................. 50-59925

[51] Int. Cl.$^2$ ............................................. C08L 33/04
[52] U.S. Cl. .................................. 260/29.6 E; 96/67; 260/8; 260/17 R; 260/29.6 WB
[58] Field of Search ................ 260/29.6 E, 8, 17 R, 260/29.6 WB

[56] References Cited

U.S. PATENT DOCUMENTS

| | | | |
|---|---|---|---|
| 2,992,101 | 7/1961 | Jelley et al. ................................. | 96/23 |
| 3,100,755 | 8/1963 | Ehrlich ............................. | 260/29.6 E |
| 3,492,243 | 1/1970 | Newman et al. ................ | 260/29.6 E |
| 3,767,448 | 10/1973 | Hutton ................................. | 106/135 |
| 3,849,361 | 11/1974 | Zweigle ........................... | 260/29.6 E |

*Primary Examiner*—M. J. Welsh
*Attorney, Agent, or Firm*—Sughrue, Rothwell, Mion, Zinn & Macpeak

[57] ABSTRACT

A process for producing finely divided polymer particles which is characterized by using a water drop containing polymer emulsion which is produced by a process comprising dissolving a copolymer containing about 10 to about 70 mol% of a carboxyl group containing vinyl compound in a solvent mixture consisting of about 20 to about 90 weight% of sec-butanol or tert-butanol and about 10 to about 80% by weight of another hydrophobic organic solvent and dispersing the resultant solution in an aqueous medium.

12 Claims, 4 Drawing Figures

PROCESS FOR PRODUCING FINELY DIVIDED POROUS POLYMER PARTICLES

BACKGROUND OF THE INVENTION

1. Field of the Invention

The present invention relates to a process for producing finely divided porous polymer particles, particularly, to a process for producing finely divided porous polymer particles composed of a copolymer of a carboxyl group containing vinyl compound and another vinyl compound.

2. Description of the Prior Art

Hitherto, in the field of photography, silica particles or insoluble synthetic polymers have been used in top layers or back layers as matting agents to prevent adhesion or the occurrence of electrostatic charges. For example, when photographic materials are stored or packed in the rolled state, they have the tendency to deteriorate in preservability because of adhesion therebetween. Therefore, a matting agent is used to prevent such adhesion. The surface of the photographic material becomes coarse due to the use of the matting agent. This coarseness prevents the occurrence of electrostatic charges, because the area of contact of the photographic material becomes relatively small. Further, the formation of Newton's rings during printing or enlargement can be prevented by the matting agent.

Moreover, the incorporation of silica particles or finely divided insoluble synthetic polymer particles into a sensitive silver halide emulsion layer of the photographic material brings about the effect that abrasion during drying is remarkably decreased and the occurrence of scratches during storage or packing of the photographic material is prevented.

However, there are many defects when silica particles or insoluble synthetic polymer particles are added to a protective layer for a sensitive silver halide emulsion layer of a photographic material. For example, when silica particles or insoluble synthetic polymer particles exist in a hydrophilic colloid protective top layer for a photographic material, the photographic material has, though slightly, a milky appearance which is not desirable for transparent photographic material. Further, these finely divided particles do not remain in only the top layer but move into the sensitive silver halide emulsion layer to displace the silver halide emulsion, and, consequently, pin-holes sometimes occur after development, that is, spots where particles of the matting agent were present become white.

It has been described in U.S. Pat. Nos. 2,992,101 and 3,767,448 that finely-divided polymer particles which are soluble a developing solution and are composed of a 1:1 copolymer of a carboxyl group containing vinyl compound, such as methacrylic acid, and an alkyl methacrylate, such as methyl methacrylate, are incorporated into a top layer or back layer of a photographic material. According to this process, the occurrence of a milky appearance decreases because the finely divided polymer particles dissolve during development of the photographic sensitive material. However, if the particle size of the soluble polymer particles is too large, it is difficult to prevent the pin-holes, that is, spots where the polymer particles were present become white. Further, in this case, it is impossible to completely avoid the occurrence of the milky appearance, because dissolution of the polymer particles during development is not perfect.

SUMMARY OF THE INVENTION

Accordingly, one object of the present invention is to provide a process for producing finely divided polymer particles which do not cause pin-holes after development of a photographic sensitive material.

Another object of the present invention is to provide a process for producing finely divided polymer particles which can be incorporated in the top layer or the back layer of a photographic material to decrease the adhesion tendency of the photographic material and to improve storability.

As a result of extensive research on the defects of prior art matting agents, the present invention has found that polymer particles do not displace the silver halide emulsion and can remain in the surface (protective) layer if the apparent specific gravity of the polymer particles is decreased and the dissolution rate of the particles in a developing solution is accelerated if the surface area of the particles is increased. Thus, the present inventor found that the above described objects can be attained by using novel finely divided porous polymer particles having a diameter of about 1 to about 10 μm.

The finely divided porous polymer particles of the present invention are composed of a copolymer of about 10 to about 70 mol% of a carboxyl group containing vinyl compound and about 30 to about 90 mol% of another vinyl compound, preferably 10–70 and 30 to 90 mol%, respectively, and are produced from oil droplets containing the polymer emulsified into an aqueous medium which is prepared by dissolving the copolymer in a solvent mixture consisting of about 20 to about 90 weight% of sec-butanol or tert-butanol and about 10 to about 80 weight% of a hydrophobic organic solvent, preferably 20–90 and 10–80 wt%, respectively, (sec-butanol or tert-butanol/hydrophobic organic solvent = about 20/80 to about 90/10, wt. ratio) and emulsifying the resultant solution into an aqueous medium.

DETAILED DESCRIPTION OF PREFERRED EMBODIMENTS

Figure 1:
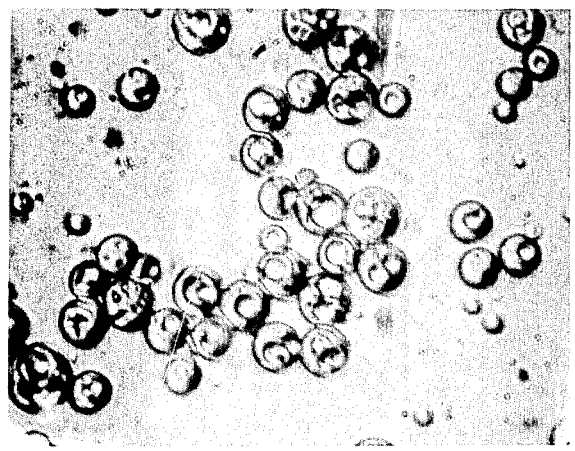
FIG. 1 is a photograph of water drops included in oil drops of the polymer observed by an optical microcope.

In the present invention, the carboxyl group containing vinyl compound used as a monomer of the copolymer forming the finally divided porous polymer particles is most preferably a carboxyl group containing ethylenically unsaturated hydrocarbon (acid or acid anhydride) and includes acrylic acid, methacrylic acid, maleic acid, maleic acid anhydride, and the like. The carboxyl group containing vinyl compound is present in the copolymer in an amount of from about 10 to about 70 mol%. A most preferred copolymer is one containing 20 to 60 mol% of the carboxyl group containing vinyl compound which most preferably is acrylic acid or methacrylic acid.

The copolymer also contains 90 to about 30, most preferably 80mol%, of another vinyl compound, which is preferably an ethylenically unsaturated hydrocarbon. This component of the copolymer can be any ethylenically unsaturated compound which is capable of being copolymerized with the above identified carboxyl group containing vinyl compound. Preferred compounds are lower esters of acrylic acid or methacrylic acid as are disclosed below, styrene, vinyl toluene, α-methylstyrene, acrylonitrile, o-chlorostyrene, p-chlorostyrene, and like materials; most preferred are lower esters of acrylic acid or methacrylic acid. Examples of such vinyl compound include lower esters of acrylic acid or methacrylic acid represented by the formula:

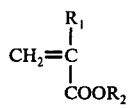

wherein $R_1$ represents a hydrogen atom or a methyl group, and $R_2$ represents an alkyl group having 1 to 4 carbon atoms.

The copolymer has about a 0.05 to about a 0.5, preferably a 0.15 to a 0.25, intrinsic viscosity $[\eta]$ (in ethanol, at 30° C; hereafter the same). The copolymer dissolves in a developing solution composed of an aqueous solution of alkali as a main ingredient and in lower alcohols such as methanol, ethanol, isopropanol or butanol, etc., aromatic hydrocarbons such as benzene or xylene, etc., as well as acetone, dioxane or tetrahydrofuran. Preferred aqueous alkali solutions contain, for ease of preparation and effective results, from about 1 to about 8 wt% alkali, even more preferably 2 to 5 wt% alkali. Acceptable results are generally obtained utilizing an aqueous alkali solution having a pH greater than about 8, even more preferably greater than 9.

In the present invention, a solvent mixture consisting about of 20 to about 90 weight% of sec-butanol or tert-butanol and about 10 to about 80 weight% of a hydrophobic organic solvent is used as the solvent for dissolving the copolymer. Examples of the hydrophobic organic solvent include halogenated hydrocarbons such as dichloromethane, chloroform, carbon tetrachloride, 1,1-dichloroethane, 1,2-dichloroethane or 1,1,1-trichloroethane, etc., aliphatic esters such as ethyl acetate, butyl acetate, or isopropyl acetate, etc., aromatic hydrocarbons such as benzene, toluene or xylene, etc., aliphatic hydrocarbons such as pentane or n-hexane, etc., and aliphatic ketones such as methyl ethyl ketone or methyl isobutyl ketone, higher aliphatic alcohols such as n-butanol, isobutanol, etc., etc.

A particularly preferred solvent mixture is one consisting of a combination of 30 to 80% by weight of sec-butanol or tert-butanol and 20 to 70% by weight of dichloromethane, carbon tetrachloride, 1,2-dichloroethane, 1,1,1-trichloroethane or ethyl acetate.

The combination of ingredients in the solvent mixture is decided by trial and error upon considering the solubility of the copolymer, the boiling point of the solvent or its miscibility with water.

For example, the following trial procedure will, with appropriate modification, permit one skilled in the art to appropriately select any combination of ingredients to be utilized. The above copolymer was firstly dissolved in sec-butanol and the resultant solution emulsified in an aqueous solvent. The thus obtained emulsion was unstable since sec-butanol has high solubility in water. Thereafter, mixed solvents of sec-butanol and dichloroethane were prepared at weight ratios of 10/90, 20/80, 30/70 . . . 80/20 and 90/10 (sec-butanol/dichloroethane). The copolymer was dissolved in these various mixed solvent systems. The thus obtained polymer solutions were then emulsified. As a result, water drop containing emulsions were obtained except for the case of using a sec-butanol/dichloroethane mixed system at a weight ratio of 90/10, where the emulsion obtained was also unstable.

It is preferred, in accordance with the present invention, that the ratio of copolymers/solvent (weight ratio) be from about 5/95 to about 50/50, even more preferably 15/85 to 35/65, and that the ratio of (copolymer plus solvent)/aqueous medium [the term aqueous medium in this context means water containing at least one emulsion stabilizer comprising a hydrophillic colloid or one surface active agent] be from about 30/70 to about 70/30 (weight ratio), even more preferably 40/60 to 60/40. By practicing within these ranges, generally excellent results are obtained in accordance with the present invention.

It should be understood, of course, that while the aqueous medium which is used must contain at least one emulsion stabilizer or one surface active agent, the aqueous medium can contain more than one of each of these materials or one or more emulsion stabilizer plus one or more surface active agents.

In the case that the above described copolymer is emulsified in an aqueous medium after being dissolved in a solvent mixture consisting of n-butanol or isobutanol and another hydrophobic organic solvent, though usual oil drops of the polymer are formed, oil drops of the polymer which contain water drops so as to form porous polymer particles are hardly formed and simple granular particles are only obtained when the solvent is removed. Thus, while n-butanol and isobutanol cannot be used as mandatory components of the mixed solvent they can be added as other hydrophobic organic solvents as above described.

In the case that the above described copolymer is emulsified in an aqueous medium after being dissoved in a solvent mixture consisting of above about 90 weight % of sec-butanol or tert-butanol and another hydrophobic organic solvent, oil drops containing stable water drops are not formed, because the compatibility of sec-butanol or tert-butanol with water is high. In the case that a solvent mixture consisting of less than about 20 weight % of sec-butanol or tert-butanol and another hydrophobic organic solvent is used, the above described polymer hardly dissolves in the solvent mixture.

In order to disperse the above described solution of the polymer in water to form oil microdrops, it is preferred to use an aqueous medium in which at least one emulsion stabilizer comprising a hydrophilic colloid at least one surface active agent is added.

As the emulsion stabilizer containing a hydrophilic colloid, there are gelatin, gelatin derivatives (for example, acetylated gelatin, phthalated gelatin or succinated gelatin, etc.), proteins (for example, albumin or casein, etc.), collodion, gum arabic, agar-agar, alginic acid, cellulose derivatives (for example, carboxymethyl cellulose alkyl esters, hydroxyethyl cellulose or carboxymethyl cellulose, etc.) and synthetic high molecular weight materials (for example, polyvinyl alcohol, polyvinyl pyrrolidone, polyacrylamide, polyacrylates, polymethacrylates, polymaleates, polystyrene sulfonates, or copolymers containing at least one of monomers in the above described polymers, etc.). Among these materials, polyampholytes such as gelatin, gelatin derivatives or proteins are particularly preferred.

As the surface active agent, anionic surface active agent or nonionic surface active agent may be used. As examples of anionic surface active agents, there can be used those described in U.S. Pat. Nos. 3,068,101, 3,415,649 and 3,666,478, which contain acid groups such as a carboxylic acid group, a sulfonic acid group, a phosphoric acid group, a sulfuric acid ester group or a phosphoric acid ester group, etc. As examples of nonionic surface active agents used, there are alkylene type materials, glycerine type materials or glycidol type materials. Among these materials, it is preferred to use common alkanol sulfuric acid esters such as those represented by the formula $ROSO_3M$ or the formula $R(OCH_2CH_2)_nOSO_3M$ (wherein R represents an alkyl group having 8 to 30 carbon atoms, M represents an alkali metal or an ammonium salt, and n represents a positive integer of 1 to 20) or alkylbenzene sulfonic acid type anionic surface active agents represented by the formula

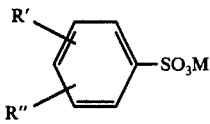

or the formula

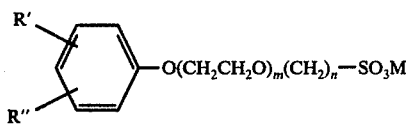

(wherein R' and R" each represents a hydrogen atom or an alkyl group having 1 to 18 carbon atoms, M represents an alkali metal of an ammonium salt, m represents a positive integer of 1 to 20 and n represents 3 or 4).

The emulsion stabilizer is included in the aqueous medium in an amount of about 1 to about 2% by weight, preferably 2 to 10% by weight.

The surface active agent is included in the aqueous medium in an amount of about 0.01 to about 3.0% by weight, preferably 0.05 to 1.0% by weight.

The above described solution of the polymer is added to the aqueous medium and the mixture dispersed by stirring for about 10 to about 60 minutes at about 100 to about 1000 rpm, by which finely divided oil drops of the polymer having about a 1 to about a 10 μm particle size are formed. The dispersion is conveniently performed at atmospheric pressure (nothing would prohibits sub- or super-atmospheric pressure, but nothing is gained by utilizing such more complicated systems) at a temperature of from about 10° to about 90° C, more conveniently from 25° to 65° C. As a result of observation of these oil drops of the polymer by magnifying by means of an optical microscope, it has been found that the oil drops of the polymer contain water microdrops (refer to FIG. 1 (Photograph 1)). It has also been found that the particle size and the number of the water drops included in the oil drops of the polymer increase with increasing amounts of sec- or tert-butanol in the polymer solution. This tendency appears greater in the case of using tert-butanol than the case of using sec-butanol. This tendency also appears with increasing amounts of the solvent to water. However, this tendency appears by varying one factor while the other factors are fixed. Accordingly, preferred values in each case cannot be unequivocally set forth because these factors are intertwined with one another.

In order to produce finely divided porous polymer particles from the water drop containing polymer emulsion thus obtained the following processes may be used.

(1) The emulsion is gradually heated to a temperature above the boiling point of the solvent used in order to remove the solvent. While not mandatory, this heating step may be conducted under reduced pressure; conveniently, it is often formed at 1 to 760 mmHg. After the resulting residual polymer emulsion is centrifugally separated, the solvent in the oil drops is removed by drying at about 40° C for about 10 hours under reduced pressure (5 mmHg), by which finely divided polymer particles having voids where water drops were present are obtained.

In the case that gelatin or gelatin derivatives are used as an emulsion stabilizer, the water drop containing polymer emulsion can be solidified by cooling at about 10° C and washed with cold water at about 2 to about 15° C to remove the solvent in the oil drops.

(2) The water drop containing polymer emulsion can be applied to the top (protective) layer or the back layer of a photographic material without removing the solvent. The solvent is then removed by drying at about 30° C for about 5 min, whereby finely divided polymer particles having voids where water drops were present are obtained.

In accordance with the present invention, when the copolymer of the present invention is added into a top (protective) layer or a backing layer, conveniently the amount utilized is from about 50 to about 400 mg/m², even more preferably 100 to 300 mg/m², though amounts outside these ranges can be used. In general, the copolymers of the present invention are not added to the silver halide emulsion layer; while such is not prohibited, generally no substantial commensurate benefits are achieved.

In the following, the present invention will be illustrated in greater detail with reference to examples. The present invention, however, it is not limited to these examples.

EXAMPLE 1

80 g of a methacrylic acid-methyl methacrylate copolymer (mol ratio of 56:44) (intrinsic viscosity ($\eta$)= 0.15) was put in a 500 ml beaker and dissolved at about 40° C in a solvent mixture consisting of 120 g of tert-butanol and 120 g of ethyl acetate.

On the other hand, 1.0 g of sodium dodecylbenzene sulfonate was put in a 100 ml beaker and dissolved in 40 g of water.

40 g of gelatin was put into a 500 ml beaker. After being swelled by adding 320 g of water over a 30 minute period, it was then dissoved at 60° C.

The aqueous solution of gelatin thus obtained and the aqueous solution of sodium dodecylbenzene sulfonate were then put into a 1 liter 3-neck flask equipped with a blade stirrer, and the mixture was gradually heated with stirring at about 60 rpm.

Figure 2:
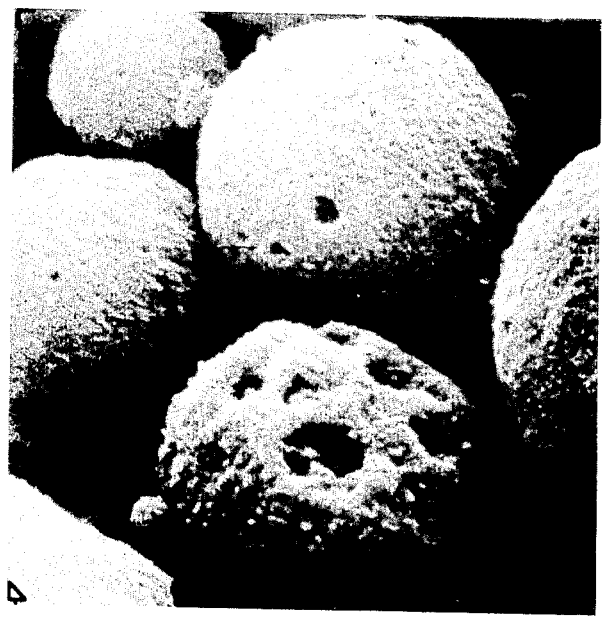
FIGS. 2 and 3 are photographs of finely divided porous polymer particles obtained by the process of the present invention observed by an electron microscope.

When the temperature in the flask reached 35° C, the solution of the methacrylic acid-methyl methacrylate copolymer previously prepared was added to the solution and the mixture was stirred for 20 minutes at about 1000 rpm at 35° C. As a result of observation of the resultant emulsion by an optical microscope [1000 X]

after putting few drops of the emulsion on a glass plate, it was found that water drops having a 0.5 to 3 μm particle size were present in the oil drops of the polymer having a 2 to 5 μm particle size. This emulsion was heated to 45° C under about a 100 mmHg reduced pressure for about 3 hours to remove the solvent in the oil drops of the polymer. After water, gelatin and sodium dodecylbenzene sulfonate were removed by centrifugal separation, the product was dried at 40° C under about 5 mmHg reduced pressure for 10 hours to produce finely-divided globular polymer particles having about a 2 to 5 μm diameter. As a result of observation of these polymer particles by a scanning type electron microscope of [10,000 X], it was found that finely divided porous polymer particles as shown in FIG. 2 (Photograph 2) were obtained.

EXAMPLE 2

Figure 3:
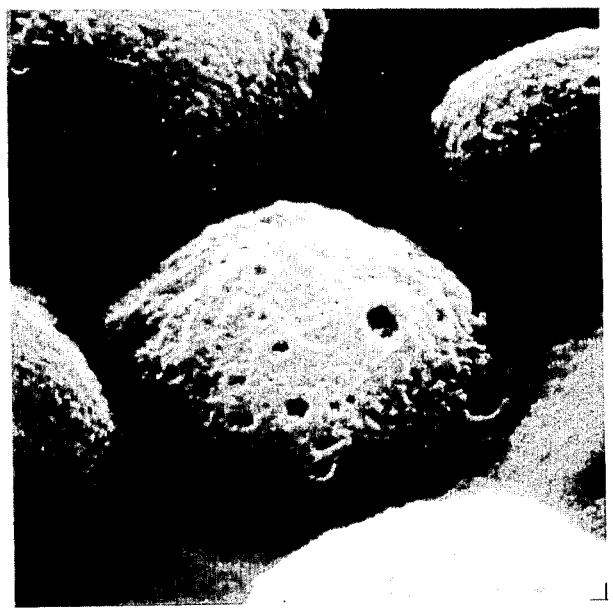

Finely divided polymer particles were obtained in the same manner as in Example 1 except that 80 g of an acrylic acid-methyl methacrylate copolymer (mol ratio of 50:50) (intrinsic viscosity ($\eta$) = 0.210) was dissolved in a solvent mixture consisting of 156 g of sec-butanol and 84 g of 1,2-dichloroethane. As a result of observation of the resultant finely divided polymer particles by an electron microscope [10,000 X], it was found that finely divided porous polymer particles having about 2 to 5 μm diameter were obtained, which are shown in FIG. 3 (Photograph 3).

EXAMPLE 3

Figure 4:
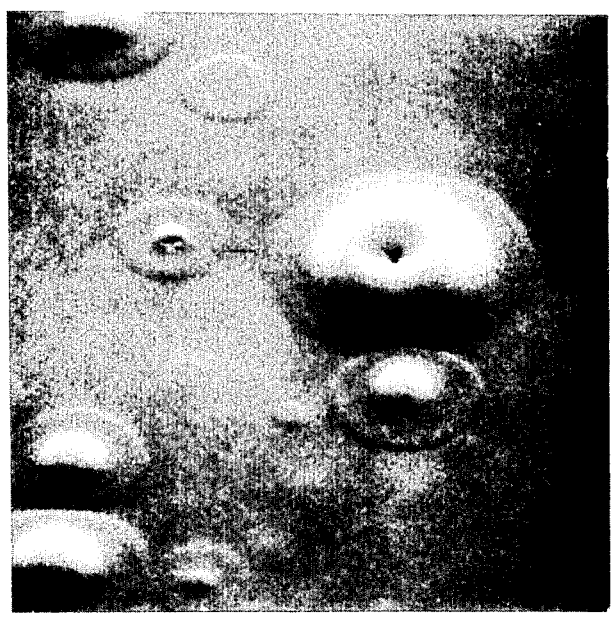
FIG. 4 is a photograph of a surface of a photographic material coated with the water drop containing emulsion obtained from the process of the present invention observed by an electron microscope.

80 g of an acrylic acid- methyl methacrylate copolymer (mol ratio of 33:67) (intrinsic viscosity ($\eta$) = 0.170) was dissolved in a solvent mixture consisting of 156 g of sec-butanol and 84 g of ethyl acetate. After adding the same aqueous solution of sodium dodecylbenzene sulfonate and the same aqueous solution of gelatin in the same manner and in the same amounts as in Example 1, the mixture was stirred at 1,000 rpm for about 20 minutes at about 32° C to disperse the solution of the polymer therein. The resultant emulsion was applied to a silver halide photographic sensitive material to form a top layer having a 0.7 μm dry thickness and dried at 30° C for 5 minutes. As a result of observation of the surface of the resultant layer by means of an electron microscope [10,000 X], it was found that finely divided porous polymer particles were formed, which are shown in FIG. 4 (Photograph 4).

While the invention has been described in detail and with reference to specific embodiments thereof, it will be apparent to one skilled in the art that various changes and modifications can be made therein without departing from the spirit and scope thereof.

What is claimed is:

1. A process for producing finely divided porous polymer particles comprising:
  (1) forming a solution by dissolving a copolymer in a solvent mixture
    (a) said copolymer comprising as one comonomer component of said copolymer, from about 10 to about 70 mol % of a vinyl compound which contains a carboxyl group,
    (b) said solvent mixture comprising
      (i) from about 20 to about 90% by weight of a solvent selected from the group consisting of sec-butanol, tert-butanol or mixtures thereof, and
      (ii) from about 10 to about 80% by weight of a hydrophobic organic solvent,
  (2) forming a water drop containing polymer emulsion by dispersing said solution in an aqueous medium in the presence of at least one emulsion stabilizer or surface active agent, and
  (3) recovering said finely divided porous polymer particles from said emulsion.

2. The process of claim 1, wherein said copolymer contains from about 30 to about 90 mol% of another vinyl compound.

3. The process of claim 2, wherein said carboxyl group containing vinyl compound is an ethylenically unsaturated hydrocarbon selected from the group consisting of acids or acid anhydrides.

4. The process of claim 3, wherein said other vinyl compound is selected from the group consisting of lower esters of acrylic acid or methacrylic acid or mixture thereof represented by the formula:

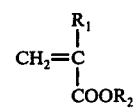

wherein $R_1$ represents a hydrogen atom or a methyl group, and $R_2$ represents an alkyl group having 1 to 4 carbon atoms.

5. The process of claim 4, wherein said ethylenically unsaturated hydrocarbon is selected from the group consisting of acrylic acid or methacrylic acid or mixtures thereof.

6. The process of claim 4, wherein the ratio of the copolymer to the solvent mixture is from about 5/95 to about 50/50, wt. ratio.

7. The process of claim 6, wherein the weight ratio of said copolymer plus said solvent mixtures to said aqueous medium is about 30/70 to about 70/30, wt. ratio.

8. The process of claim 7, wherein said aqueous medium is water containing at least one emulsion stabilizer comprising a hydrophilic colloid or at least one surface active agent.

9. The process of claim 7 wherein said aqueous medium is water containing at least one emulsion stabilizer comprising a hydrophilic colloid and at least one surface active agent.

10. The process of claim 1, wherein said copolymer has an intrinsic viscosity of from about 0.05 to about 0.5 in ethanol at 30° C.

11. The process of claim 1, wherein said copolymer contains from about 20 to about 60 mol % of acrylic acid or methacrylic acid and another vinyl comonomer selected from the group consisting of lower esters of acrylic acid or methacrylic acid represented by the formula:

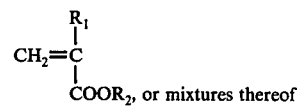

wherein $R_1$ represents a hydrogen atom or a methyl group, and $R_2$ represents an alkyl group having 1 to 4 carbon atoms, and wherein said solvent mixture consists of from about 20 to about 90% by weight of sec-butanol or tert-butanol and about 10 to about 80% by weight of a hydrophobic organic solvent selected from the group consisting of halogenated hydrocarbons, aliphatic esters, aromatic hyrocarbons, aliphatic hydrocarbons, aliphatic ketones, aliphatic alcohols or mixtures thereof, further wherein the weight ratio of said copolymer to said solvent mixture is from about 15/85 to 35/65 and the weight ratio of said copolymer plus said solvent mixture to said aqueous medium is from about 40/60 to 60/40, said aqueous medium containing from about 1 to about 20% by weight of an emulsion stabilizer and/or from about 0.01 to about 3.0% by weight of a surface active agent.

12. The process of claim 11, wherein said copolymer has an intrinsic viscosity of from about 0.05 to about 0.5 in ethanol at 30° C.

* * * * *